(12) United States Patent
Kemer et al.

(10) Patent No.: US 7,409,888 B2
(45) Date of Patent: Aug. 12, 2008

(54) COVER FOR PARKING BRAKE CONTROL VALVE BUTTON

(75) Inventors: John J. Kemer, Avon Lake, OH (US); Andrew Marsh, Elyria, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 168 days.

(21) Appl. No.: 10/314,695

(22) Filed: Dec. 9, 2002

(65) Prior Publication Data

US 2004/0108178 A1 Jun. 10, 2004

(51) Int. Cl.
*G05G 1/10* (2006.01)
(52) U.S. Cl. ...................................................... 74/553
(58) Field of Classification Search ................ 74/553, 74/548, 558, 558.5
See application file for complete search history.

(56) References Cited

U.S. PATENT DOCUMENTS

| | | | |
|---|---|---|---|
| 3,790,734 A * | 2/1974 | Raab et al. ............... 200/302.2 |
| 4,230,921 A * | 10/1980 | Wearing et al. ............ 200/526 |
| D265,816 S | 8/1982 | Matre |
| 4,390,765 A | 6/1983 | Sado |
| 4,456,357 A * | 6/1984 | Sunouchi et al. ............ 396/263 |
| 4,605,124 A * | 8/1986 | Sandel et al. ............... 206/223 |
| 4,654,934 A | 4/1987 | Hasegawa |
| 4,766,271 A | 8/1988 | Mitsuhashi et al. |
| 4,815,317 A * | 3/1989 | Matsumoto et al. ........ 73/118.1 |
| 4,943,694 A | 7/1990 | Kroth |
| 4,969,241 A | 11/1990 | Griffin |
| 5,161,285 A | 11/1992 | Jerjian |
| 5,256,842 A | 10/1993 | Bianco |
| 5,310,973 A * | 5/1994 | Lee ........................... 200/345 |
| 5,558,211 A * | 9/1996 | Heydner et al. ............. 200/553 |
| 5,568,708 A * | 10/1996 | Kassardjian et al. .......... 74/553 |
| 5,679,304 A | 10/1997 | Watanabe et al. |
| D387,734 S | 12/1997 | Hawkins, Jr. et al. |
| 5,735,594 A * | 4/1998 | Own ........................... 362/202 |
| 5,804,299 A | 9/1998 | Nakata et al. |
| 5,974,909 A * | 11/1999 | Bauer et al. .................... 16/430 |
| D418,097 S | 12/1999 | Leschke et al. |
| 6,073,730 A * | 6/2000 | Abe ......................... 188/24.11 |
| 6,187,514 B1 | 2/2001 | Kiyosawa et al. |
| 6,193,096 B1 | 2/2001 | Raoult |
| 6,210,064 B1 * | 4/2001 | White et al. ................. 401/279 |
| D445,232 S | 7/2001 | Price |
| 6,270,860 B1 | 8/2001 | Nakata et al. |
| D454,818 S | 3/2002 | MacGregor |

(Continued)

FOREIGN PATENT DOCUMENTS

EP 210973 A * 2/1987

(Continued)

*Primary Examiner*—Chong H Kim
(74) *Attorney, Agent, or Firm*—Calfee, Halter & Griswold LLP

(57) ABSTRACT

A cover for a vehicle parking brake control valve button including an elastomeric body and a plurality of elastic ridges. The body of the cover includes a rim and a recess designed to fit the contour of the control valve button. The ridges are designed to provide enough rigidity to support pressure applied thereto, and enough elasticity to absorb energy created by the actuation of the button. The absorption of the energy dampens the stinging sensation typically felt by the operator when actuating the parking brakes.

13 Claims, 1 Drawing Sheet

U.S. PATENT DOCUMENTS

| | | |
|---|---|---|
| 6,383,218 B1 | 5/2002 | Sourdille et al. |
| 6,413,598 B1 | 7/2002 | Motoki et al. |
| 6,561,971 B1 * | 5/2003 | Akiba ................. 600/168 |
| 6,595,561 B1 * | 7/2003 | Szablewski et al. ......... 292/304 |
| 2002/0095779 A1 * | 7/2002 | Ando et al. .................. 29/622 |
| 2003/0209574 A1 * | 11/2003 | Lin et al. ................. 222/548 |

FOREIGN PATENT DOCUMENTS

JP 03173023 A * 7/1991

* cited by examiner

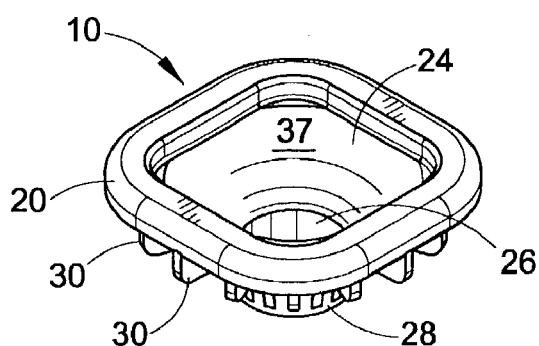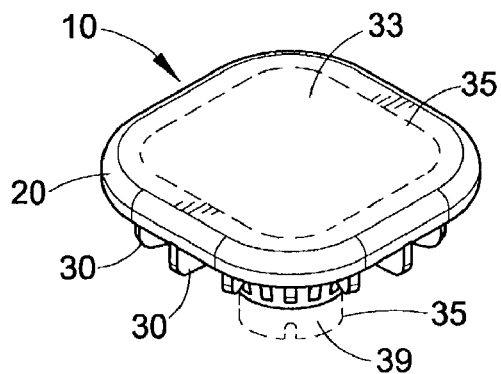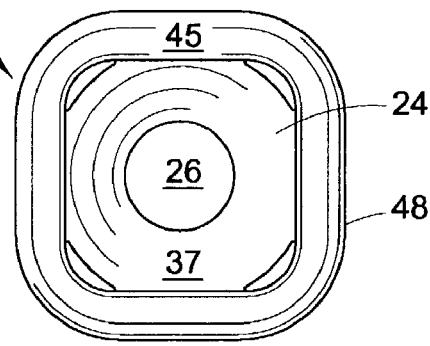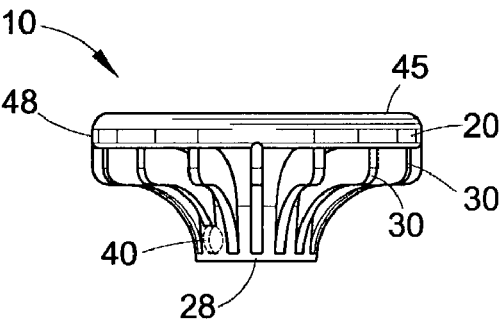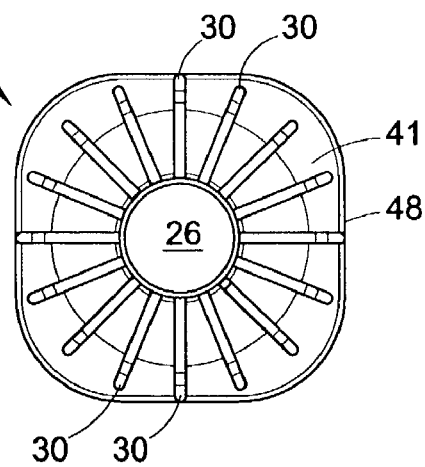

COVER FOR PARKING BRAKE CONTROL VALVE BUTTON

FIELD OF THE INVENTION

The invention relates to an ergonomic button cover, and more specifically to an ergonomic parking brake control valve button.

BACKGROUND OF THE INVENTION

Many commercial vehicles, and most notably school buses, require the actuation of the vehicle parking brakes numerous times throughout the course of a given day. The vehicle parking brakes are actuated by pulling on the parking brake control valve. This action frequently causes a painful stinging sensation to run through the driver's hand each time the parking brake is applied. Thus, with increase use of the parking brake, driver's can develop sustained pain.

In most states, school bus drivers must apply the bus park brakes each time the vehicle is parked, the vehicle comes to a railroad crossing, or a child crosses in front of the bus. Throughout the course of a day, a bus driver will be required to actuate the parking brakes a significant number of times, thereby possibly causing the driver to suffer some discomfort. More recently, a number of states have implemented regulations requiring school bus drivers to actuate the bus parking brakes each time the bus stops to pick up passengers. This change in the law has caused the number of times that the driver must actuate the bus parking brakes, by pulling on the bus parking brake control valve button, to increase dramatically. As such, the discomfort felt by these drivers has also increased dramatically. Therefore, there is a growing need to dampen the stinging sensation created by the actuation of a vehicle's parking brakes.

SUMMARY OF THE INVENTION

A cover for a vehicle control valve button including a rim and a recess that mate with the contour of the control valve button. The cover also includes an aperture wherein a shaft of the button can be inserted. A plurality of ridges are located on the outside contour of the cover. The ridges are elastic and provide a dampening of energy that is created by the actuation of the button.

BRIEF DESCRIPTION OF THE DRAWINGS

The parking brake control valve button cover of the present invention may be more readily understood by reference to the following drawings. While certain embodiments are shown as illustrative examples of the button cover, the scope of this application should not be construed as limited to these illustrative examples.

FIG. 1 is a perspective top view of a vehicle parking brake control valve button cover;

FIG. 2 is a top view of the vehicle parking brake control valve button cover of FIG. 1;

FIG. 3 is a side view of the vehicle parking brake control valve button cover of FIG. 1;

FIG. 4 is a bottom view of the vehicle parking brake control valve button cover of FIG. 1; and FIG. 5 is a perspective view of a vehicle parking brake control valve button cover as applied to a vehicle parking brake control valve button.

DETAILED DESCRIPTION OF THE INVENTION

The vehicle parking brake control valve cover 10 includes rim 20, recess 24, aperture 26, lip 28 and one or more ridges 30. The cover 10 may be made of any suitable material for absorbing or dampening energy. In one embodiment, the cover 10 is made from a soft rubber material, such as, for example neoprene. In other embodiments, the cover 10 may be made from foams or urethanes.

The rim 20, which mates with the top 33 of button 35 when the button is inserted into the cover, may conform to the shape of the button 35, such as, for example, a square or diamond shaped. Although it should be appreciated by one skilled in the art that the rim 20 may have a variety of shapes based on the configuration of the button 35, it should also be appreciated that the shape of the button is a recommended industry standard dictated by safety regulations and therefore does not typically depart from the standard design illustrated in the Figures. However, to the extent such standards allow the button to take on different configurations and geometries, such configurations and geometries are intended to be included within this application as defined by the scope of the claims. The rim 20 may alternatively have a different geometry from the button 35. The thickness of the rim 20 may be determined by the thickness of the top 33 of the button 35. The rim 20 is generally dimensioned to fit the thickness of the top 33 of the button 35 such as to have the underside of the top 33 of the button 35 rest against the recessed surface 37 of recess 24 and the top 33 of the button 35 generally flush with the surface 45 of rim 20. A flush surface, however, is not required.

The surface 37 of the recess 24 follows the contour of the button 35 such as to form a tight fit against the button. The surface 37 of the recess 24 extends inwardly, following the contour of the button until it is at the dimension of the diameter of the button shaft 39, which may vary depending on the button. The surface 37 of the recess 24 then extends downward, away from the rim 20 thereby forming the lip 28 that fits snug around the shaft 39 of the button 35 when the button is inserted through aperture 26. The lip 28, although not required, provides additional support to the cover 10, and thus it is preferred to include a lip that extends a significant portion down the shaft of the button. Furthermore, the lip 28 may also include one or more optional holes 40 wherein a screw or pin can be inserted to secure the button in place. One skilled in the art should understand that the rim 20 can be designed to fit the contour of the users hand, thereby providing an improved gripping surface. As such, the rim 20 may take a number of different shapes and sizes depending on the desired feel.

The underside 41 of the surface 37 of the recess 24 includes a number of ridges 30, that extend perpendicular to the surface 45 of the rim 20. These ridges 30 are designed to be elastic and thereby adsorb the energy that causes the stinging sensation in the operator's fingers. Preferably, the ridges 30 have an elasticity between approximately 40 and 75 durometer Shore A, and preferably between approximately 50 and 55 durometer Shore A. Furthermore, a set of approximately 12-18 ridges 30 is most preferably, although the number can vary, especially as the size of the button varies. The ridges 30 preferably originate along the lip 28 and follow the contour of the underside 41 of the recess 24 ending at or proximate to the end 48 of the rim 20. However, one skilled in the part should appreciate that the configuration, such as, for example, the thickness, length, and the taper of the ridges may vary such as to provide a good gripping and dampening surface. One skilled in the art should also appreciate that the ridges may be separate from the cover, such as, for example, a separate sleeve that fits over the lip of the cover. These different configurations are considered as part of this invention to the extent that they are within the scope of the claims.

When the vehicle parking brake control valve button 35 is inserted into the cover 10, the shaft 39 is fit through the aperture 26 and the top 33 of the button is aligned with the geometry of the rim 20 such that when the button is fully inserted, the top of the button is flush with the surface 45 of rim 20. When the vehicle parking brake control valve button 35 is actuated, the operator fingers can rest against the ridges 30, preferably extending across multiple ridges, as the button is being pulled. As pressure is applied to the ridges 30 by the operator's fingers, the elasticity of the ridges 30 provides sufficient rigidity to allow the button to be actuated, while also providing enough elasticity to adsorb the energy that causes the stinging sensation.

One skilled in the art should appreciate that the invention covered in this application may be applicable to pre-existing buttons, or may be adapted for use with new buttons. Further, it is contemplated that the cover may be incorporated into the molding of the plastic button or may be a separate piece as shown in the Figures. The cover may be secured to the button in any conventional means, including friction fit, adhesive, a sealing lip attached to the rim, or use of a securing pin.

The invention claimed is:

1. A control valve button assembly for a vehicle comprising:
   a button having a button top attached to a button shaft;
   a cover connected to the button such that the cover moves with the button when the button is actuated, the cover including a rim defining a first aperture, a lip defining a second aperture, and an inner surface forming a recess between the first aperture and the second aperture, wherein the cover receives the button assembly within the recess such that the inner surface follows the outer contour of the button top and the button shaft and wherein the shaft extends out of the cover away from button top, and wherein the rim is larger than the lip; and
   a plurality of elastic ridges located on an outside surface of said cover for dampening energy created by the actuation of the button; the ridges extending axially along the outer surface from a position proximate the lip to the outer surface on the underside of the recess.

2. The control valve button assembly of claim 1 wherein the elasticity of the ridges is between about 40 and about 75 durometer Shore A.

3. The control valve button assembly of claim 1 wherein the elasticity of the ridges is between about 50 and about 55 durometer Shore A.

4. The control valve button assembly of claim 1 wherein the number of ridges included on the cover is between 12 and 18.

5. The control valve button assembly of claim 1 wherein the first aperture is generally square or diamond shaped.

6. The control valve button assembly of claim 1 wherein the first aperture and the recess mate with the contour of the button when the cover is assembled to the button.

7. The control valve button assembly of claim 1 wherein the rim is configured to fit the contour of a user's hand.

8. The control valve button assembly of claim 1 wherein the lip fits snug around the shaft.

9. The control valve button assembly of claim 1 wherein the plurality of elastic ridges and the cover are formed as a single piece.

10. The control valve button assembly of claim 1 wherein the cover is elastic.

11. The control valve button assembly of claim 1 wherein the rim has a top surface that is about flush with the button top when said button is fully inserted into the first aperture.

12. The control valve button assembly of claim 1 wherein the ridges extend radially perpendicular to the outer surface.

13. The control valve button assembly of claim 4 wherein the plurality of ridges are generally evenly spaced around the circumference of the cover.

* * * * *